(12) United States Patent
Hsiao et al.

(10) Patent No.: US 12,403,683 B2
(45) Date of Patent: Sep. 2, 2025

(54) METHOD FOR PRODUCING OUTER SHELL

(71) Applicant: Giant Glory International Limited, Apia (WS)

(72) Inventors: Cheng-Ping Hsiao, Changzhi Township (TW); Yi-Feng Huang, New Taipei (TW); Huei-Chuen Tseng, New Taipei (TW)

(73) Assignee: Giant Glory International Limited, Apia (WS)

( * ) Notice: Subject to any disclaimer, the term of this patent is extended or adjusted under 35 U.S.C. 154(b) by 100 days.

(21) Appl. No.: 18/437,435

(22) Filed: Feb. 9, 2024

(65) Prior Publication Data

US 2025/0135763 A1 May 1, 2025

(30) Foreign Application Priority Data

Oct. 30, 2023 (TW) ................. 112141477

(51) Int. Cl.
| | |
|---|---|
| *B32B 37/18* | (2006.01) |
| *B32B 3/08* | (2006.01) |
| *B32B 3/30* | (2006.01) |
| *B32B 7/022* | (2019.01) |
| *B32B 15/04* | (2006.01) |
| *B32B 15/08* | (2006.01) |
| *B32B 15/20* | (2006.01) |

(Continued)

(52) U.S. Cl.
CPC .............. *B32B 37/182* (2013.01); *B32B 3/08* (2013.01); *B32B 3/30* (2013.01); *B32B 7/022* (2019.01); *B32B 15/043* (2013.01); *B32B 15/08* (2013.01); *B32B 15/20* (2013.01); *B32B 37/24* (2013.01); *B32B 38/0012* (2013.01); *C25D 11/04* (2013.01); *B32B 2037/243* (2013.01); *B32B 2038/002* (2013.01); *B32B 2307/54* (2013.01); *B32B 2307/7376* (2023.05); *B32B 2311/24* (2013.01); *B32B 2457/00* (2013.01)

(58) Field of Classification Search
CPC ............. B32B 2457/00; B32B 2311/24; B32B 2307/54; B32B 2038/002; B32B 2037/243; B32B 2307/7376; B32B 38/0012; B32B 37/24; B32B 15/20; B32B 15/08; B32B 15/043; B32B 3/30; B32B 3/08; B32B 7/022; B32B 37/182; C25D 11/04
See application file for complete search history.

(56) References Cited

PUBLICATIONS

CN106863923A (Year: 2017).*

(Continued)

*Primary Examiner* — Vishal I Patel
(74) *Attorney, Agent, or Firm* — Thomas | Horstemeyer, LLP (57) ABSTRACT

A method for producing an outer shell includes steps of a) stacking a second plate on a first plate, the second plate having an accommodation space that is recessed toward the first plate; b) disposing a filling material in the accommodation space; c) stacking a third plate on the second plate so as to cover the filling material and to form a composite structure; and d) stamping the composite structure such that a peripheral portion of the composite structure is bent, thereby forming an outer shell. In step b), a weight of the filling material is lower than that of the first plate, that of the second plate, and that of the third plate, or rigidity of the filling material is higher than that of the first plate, that of the second plate, and that of the third plate.

12 Claims, 6 Drawing Sheets

(51) Int. Cl.
*B32B 37/24* (2006.01)
*B32B 38/00* (2006.01)
*C25D 11/04* (2006.01)

(56) References Cited

PUBLICATIONS

Shell Structure (CN 103379762A) (Year: 2013).*
Fibre Product With Three-dimensional Surface And Forming Method Thereof (CN 101875243 A) (Year: 2010).*

* cited by examiner

METHOD FOR PRODUCING OUTER SHELL

CROSS-REFERENCE TO RELATED APPLICATION

This application claims priority to Taiwanese Invention Patent Application No. 112141477, filed on Oct. 30, 2023, the entire disclosure of which is incorporated by reference herein.

FIELD

The disclosure relates to a method for producing an outer shell, and more particularly to a method for producing an outer shell having a composite structure.

BACKGROUND

An outer shell of a conventional electronic product is generally formed by stamping a plate (i.e., an aluminum alloy plate). Furthermore, to improve the aesthetics of the outer shell, the outer shell is often subjected to a sandblasting treatment or an anodizing treatment. However, the aluminum alloy plate is limited by its material characteristics, so that its applications are limited after being stamped. With particular advancement in the technology industry, market demand for consumer electronics such as computers, peripherals, communication devices, etc. is increasingly greater, and these consumer electronics are becoming increasingly thinner and smaller. Therefore, the outer shell made of the aluminum alloy plate by stamping no longer meets the market demand.

SUMMARY

Therefore, an object of the disclosure is to provide a method for producing an outer shell that can alleviate at least one of the drawbacks of the prior art.

According to the disclosure, the method includes steps of:
a) stacking a second plate on a first plate, the second plate having an accommodation space therein that is recessed toward the first plate;
b) disposing a filling material in the accommodation space of the second plate;
c) after step b), stacking a third plate on the second plate so as to cover the filling material and to form a composite structure; and
d) after step c), stamping the composite structure such that a peripheral portion of the composite structure is bent, thereby forming an outer shell,
wherein, in step b), a weight of the filling material is lower than a weight of the first plate, a weight of the second plate, and a weight of the third plate, or rigidity of the filling material is higher than rigidity of the first plate, rigidity of the second plate, and rigidity of the third plate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Furthermore, the terms "step a)," "step b)," and other alphabets used in connection with steps in a method of this disclosure are solely for descriptive purposes, and should not be understood as indicating or implying a sequence of the steps in the method.

According to an embodiment of the disclosure, a method for producing an outer shell having a composite structure is adapted for producing outer shells of consumer electronics (not shown) or other electrical appliances (not shown), and includes steps a), b), c), and d).

Figure 1:
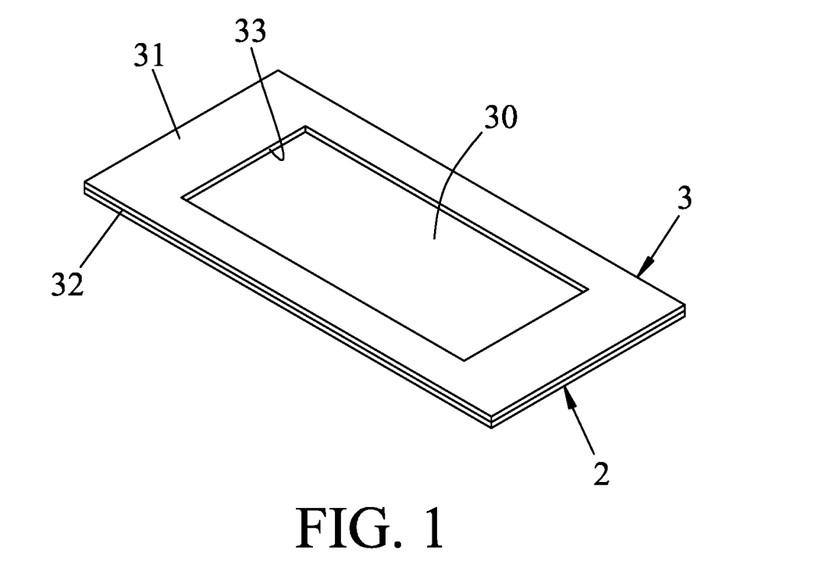
FIG. 1 is a schematic perspective view illustrating step a) in a method for producing an outer shell of an embodiment according to the disclosure.

Referring to FIG. 1, step a) involves stacking a second plate 3 on a first plate 2. The second plate 3 has an accommodation space 30 therein that is recessed toward the first plate 2, and the first plate 2 is a hole-less plate. In some embodiments, in step a), the accommodation space 30 of the second plate 3 penetrates an upper surface 31 and a lower surface 32 of the second plate 3, and is defined by a surrounding surface 33 that interconnects the upper surface 31 and the lower surface 32 of the second plate 3 so that the first plate 2 is exposed from the accommodation space 30. Each of the first plate 2 and the second plate 3 is made of aluminum alloy.

Figure 2:
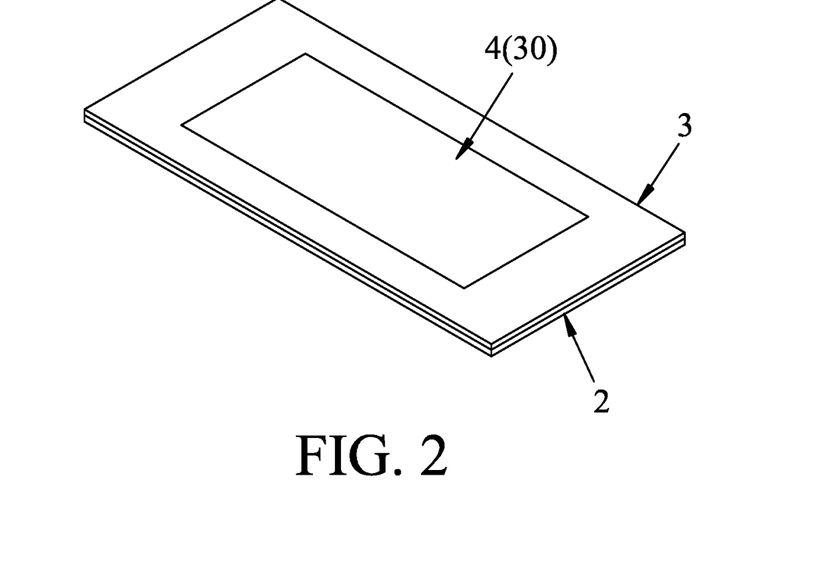
FIG. 2 is a schematic perspective view illustrating step b) in the method of the embodiment according to the disclosure.

Referring to FIG. 2, step b) involves disposing a filling material 4 in the accommodation space 30 of the second plate 3. In this embodiment, step b) is conducted after step a). In other embodiments, however, step b) may be conducted before step a).

Figure 3A:
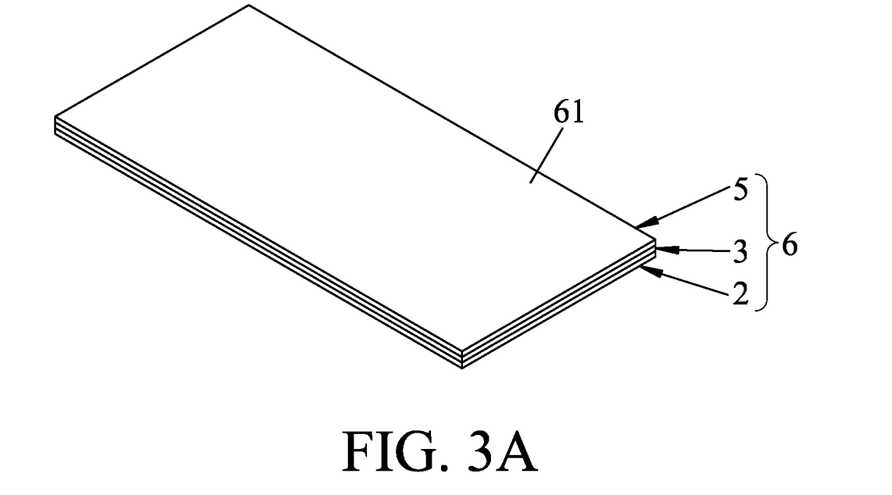
FIG. 3A is a schematic perspective view illustrating step c) in the method of the embodiment according to the disclosure.
Figure 3B:
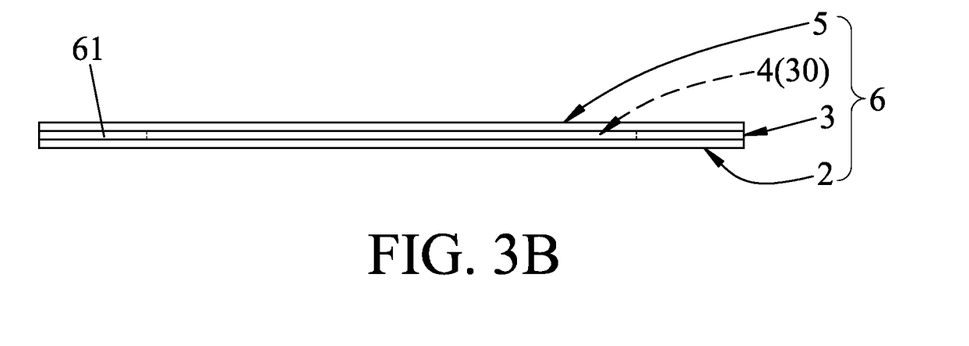
FIG. 3B is a schematic front view of FIG. 3A.

Referring to FIGS. 3A and 3B, in step c), a third plate 5 is stacked on the second plate 3 after step b), so as to cover the filling material 4 and to form a composite structure 6 (i.e., a sandwich structure) that is cooperatively defined by the first plate 2, the second plate 3, the third plate 5, and the filling material 4 disposed in the accommodation space 30. The third plate 5 is a hole-less plate. In certain embodiments, the third plate 5 is made of aluminum alloy.

Figure 4A:
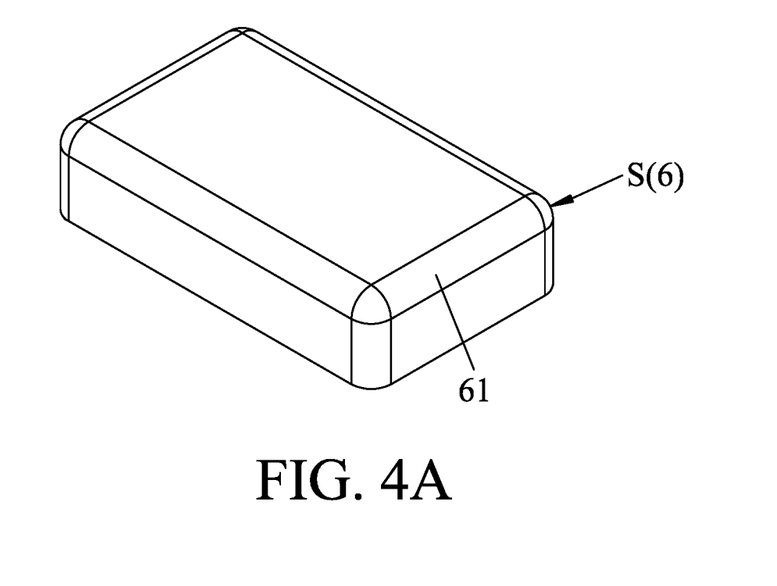
FIG. 4A is a schematic perspective view illustrating step d) in the method of the embodiment according to the disclosure.
Figure 4B:
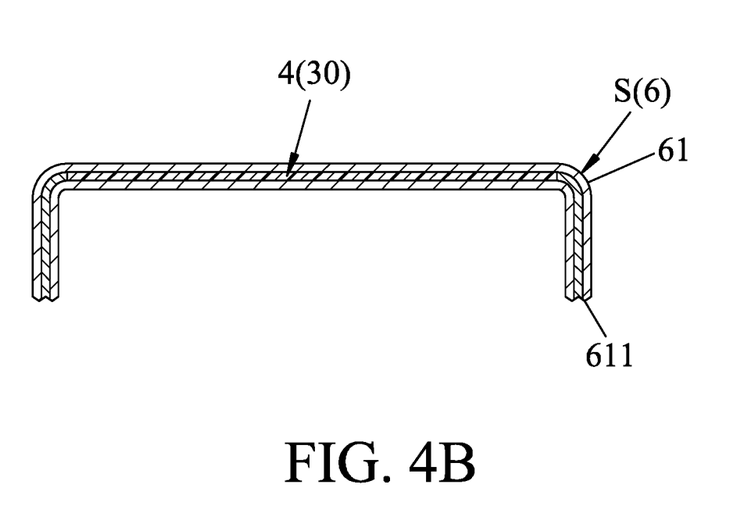
FIG. 4B is a sectional view of FIG. 4A.

Referring to FIGS. 4A and 4B, step d) involves stamping the composite structure 6 (see FIGS. 3A and 3B) after step c) such that a peripheral portion 61 of the composite structure 6 is bent, thereby forming an outer shell(S), as shown in FIGS. 4A and 4B, which is suitable for the consumer electronics or other electrical appliances. In this embodiment, the peripheral portion 61 of the composite structure 6 includes a part of the first plate 2, a part of the second plate 3, and a part of the third plate 5, and is free of the filling material 4.

To increase applications of the outer shell(S) obtained by the abovementioned method according to the present disclosure, a weight of the filling material 4 is lower than a weight of the first plate 2, a weight of the second plate 3, and a weight of the third plate 5, or rigidity of the filling material 4 is higher than rigidity of the first plate 2, rigidity of the second plate 3, and rigidity of the third plate 5. In some embodiments, the filling material 4 is one of a plastic plate, a carbon fiber plate, a magnesium alloy plate, a stainless steel plate, and a titanium alloy plate. It should be noted that the filling material 4 is selected according to requirements of the consumer electronics or other electrical appliances. For example, to satisfy the requirement of the consumer electronics being lightweight, the filling material 4 may be a lightweight material, e.g., the plastic plate, the carbon fiber plate, or the magnesium alloy plate. For yet another example, to satisfy the requirement of structural strength of the electrical appliances, the filling material 4 may be a material with desired rigidity, e.g., the stainless steel plate or the titanium alloy plate.

It should further be noted that, for the composite structure 6 to obtain a uniform stress distribution when step d) is performed, in some embodiments, a thickness of the first plate 2 is equal to a thickness of the third plate 5.

In addition, to enable the outer shell(S) to satisfy different requirements, in certain embodiments, a thickness of the second plate 3 is 0.5 times to 2 times of each of the thickness of the first plate 2 and the thickness of the third plate 5. In the case of satisfying the requirement of being lightweight, when the thickness of the second plate 3 is 2 times of each of the thickness of the first plate 2 and the thickness of the third plate 5, the second plate 3 is capable of providing the accommodation space 30 sufficient for disposing the filling material 4 (such as the plastic plate, the carbon fiber plate, or the magnesium alloy plate). In this embodiment, the filling material 4 is a lightweight plastic plate, and the thickness of the second plate 3 is 2 times of each of the thickness of the first plate 2 and the thickness of the third plate 5, but is not limited thereto.

In certain embodiments, the method further includes step e) after step d), step f) after step e), and step g) after step f).

Figure 5:
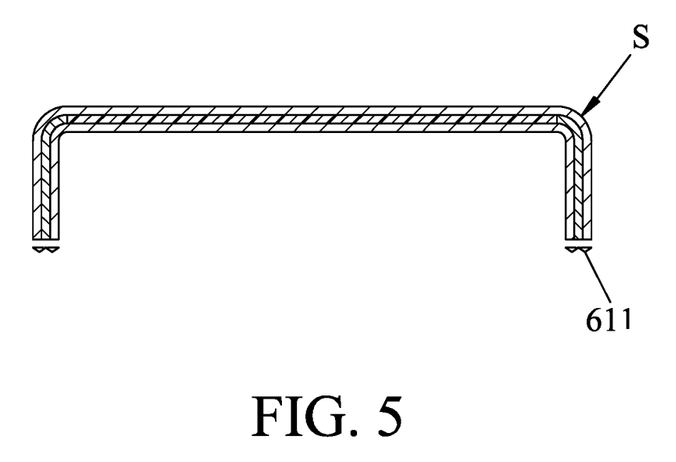
FIG. 5 is a cross-sectional view illustrating step e) in the method of the embodiment according to the disclosure.

In step d), after stamping, an end surface of the peripheral portion 61 of the composite structure 6 is an irregular surface 611 as shown in FIG. 4B. The irregular surface 611 is an excess material, which is generally referred to as burrs. Referring to FIG. 5, step e) involves removing the irregular surface 611 (i.e., the excess) as shown in FIG. 4B using a computer numerical control (CNC) milling machine.

Figure 6:
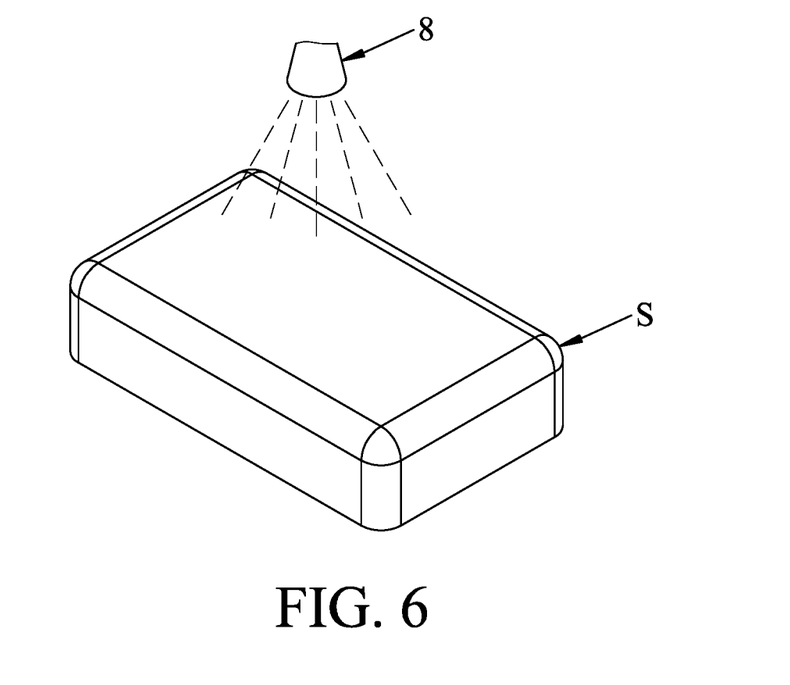
FIG. 6 is a schematic perspective view illustrating step f) in the method of the embodiment according to the disclosure.

Referring to FIG. 6, step f) involves subjecting the outer shell(S) to a sandblasting treatment after step e). Specifically, step f) is conducted using a sandblasting device 8 so that defects (not shown in the figures) formed on a surface of the outer shell(S) after step d) are removed.

Figure 7:
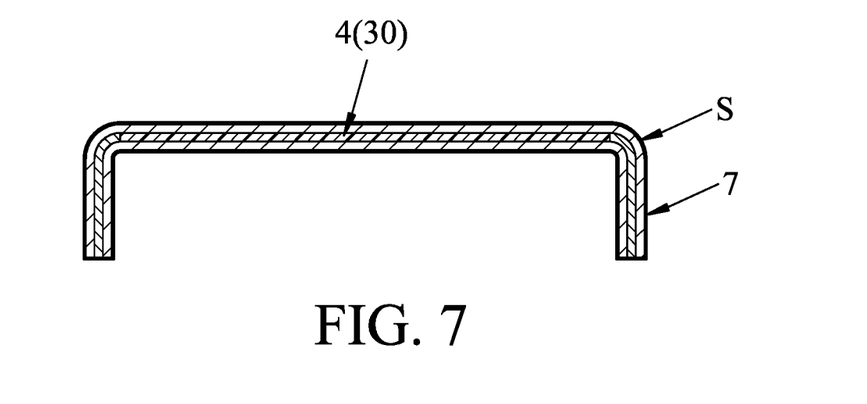
FIG. 7 is a cross-sectional view illustrating step g) in the method of the embodiment according to the disclosure.

Referring to FIG. 7, step g) involves subjecting the outer shell(S) to an anodizing treatment after step f), thereby forming an aluminum oxide film 7 on the surface of the outer shell(S) so as to beautify the appearance of the outer shell(S).

It can be known from the aforesaid details regarding the method for producing the outer shell according to the present disclosure, that the accommodation space 30 of the second plate 3 may be filled with the suitable filling material 4 according to the requirements (e.g., being lightweight or having the structural strength) of the consumer electronics or electronic appliances. In the case of satisfying the requirement of being lightweight, the filling material 4 may be the plastic plate, the carbon fiber plate, or the magnesium alloy plate. In the case of satisfying the requirement of having the structural strength, the filling material 4 may be the stainless steel plate or the titanium alloy plate. As a result, the applications of the outer shell(S) may be increased. In addition, deformation of the composite structure 6 generated during step d) may confine the filling material 4. Moreover, since the filling material 4 disposed in the accommodation space 30 is not exposed outside the composite structure 6, potential corrosion may be avoided.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:
1. A method for producing an outer shell, comprising steps of:
   a) stacking a second plate on a first plate, the second plate having an accommodation space therein that is recessed toward the first plate;
   b) disposing a filling material in the accommodation space of the second plate;

c) after step b), stacking a third plate on the second plate so as to cover the filling material and to form a composite structure; and d) after step c), stamping the composite structure such that a peripheral portion of the composite structure is bent, thereby forming the outer shell, wherein, in step b), a weight of the filling material is lower than a weight of the first plate, a weight of the second plate, and a weight of the third plate, or rigidity of the filling material is higher than rigidity of the first plate, rigidity of the second plate, and rigidity of the third plate.

2. The method for producing the outer shell as claimed in claim 1, wherein each of the first plate and the third plate is a hole-less plate.

3. The method for producing the outer shell as claimed in claim 1, wherein in step a), the accommodation space of the second plate penetrates an upper surface of the second plate and a lower surface of the second plate.

4. The method for producing the outer shell as claimed in claim 1, wherein a thickness of the first plate is equal to a thickness of the third plate.

5. The method for producing the outer shell as claimed in claim 4, wherein in step b), the filling material is one of a plastic plate, a carbon fiber plate, a magnesium alloy plate, a stainless steel plate, and a titanium alloy plate.

6. The method for producing the outer shell as claimed in claim 5, wherein a thickness of the second plate is 0.5 times to 2 times of each of the thickness of the first plate and the thickness of the third plate.

7. The method for producing the outer shell as claimed in claim 1, wherein in step b), the filling material is one of a plastic plate, a carbon fiber plate, a magnesium alloy plate, a stainless steel plate, and a titanium alloy plate.

8. The method for producing the outer shell as claimed in claim 1, wherein a thickness of the second plate is 0.5 times to 2 times of each of a thickness of the first plate and a thickness of the third plate.

9. The method for producing the outer shell as claimed in claim 1, wherein each of the first plate, the second plate and the third plate is made of aluminum alloy.

10. The method for producing the outer shell as claimed in claim 1, wherein in step d), an end surface of the peripheral portion of the composite structure is an irregular surface, and the method further includes step e) of removing the irregular surface.

11. The method for producing an outer shell as claimed in claim 10, further comprising, after step e), step f) of subjecting the outer shell to a sandblasting treatment.

12. The method for producing an outer shell as claimed in claim 11, further comprising, after step f), step g) of subjecting the outer shell to an anodizing treatment.

* * * * *